US007526309B2

(12) United States Patent
Kronlund et al.

(10) Patent No.: US 7,526,309 B2
(45) Date of Patent: Apr. 28, 2009

(54) MOBILE CALL ROUTING BASED ON DETECTED WIRELESS PERSONAL AREA NETWORK DEVICES

(75) Inventors: Curtis Duane Kronlund, Cottage Grove, MN (US); Scott Alan Moore, Rochester, MN (US); Gregory Allan Olson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 11/149,482

(22) Filed: Jun. 9, 2005

(65) Prior Publication Data

US 2006/0281484 A1    Dec. 14, 2006

(51) Int. Cl.
*H04M 1/00* (2006.01)
*H04M 3/42* (2006.01)

(52) U.S. Cl. .................................. 455/550.1; 455/414.1

(58) Field of Classification Search ............... 455/412.2, 455/414.1, 550.1; 379/220.01, 88.16, 66.16; 725/81; 709/219, 204, 206, 205
See application file for complete search history.

(56) References Cited

U.S. PATENT DOCUMENTS

| | | | |
|---|---|---|---|
| 2002/0004403 A1 | 1/2002 | Yariv et al. | |
| 2002/0114350 A1* | 8/2002 | Tang et al. | 370/469 |
| 2003/0125017 A1* | 7/2003 | Greene et al. | 455/414 |
| 2003/0135624 A1 | 7/2003 | McKinnon et al. | |
| 2004/0059781 A1* | 3/2004 | Yoakum et al. | 709/204 |
| 2005/0141479 A1* | 6/2005 | Ozugur et al. | 370/351 |
| 2006/0093121 A1* | 5/2006 | Sylvain | 379/220.01 |
| 2006/0271968 A1* | 11/2006 | Zellner | 725/81 |
| 2006/0285661 A1* | 12/2006 | Patel et al. | 379/88.16 |
| 2007/0005729 A1* | 1/2007 | Cox et al. | 709/219 |

OTHER PUBLICATIONS

M. Gortz et al., "Context-aware Communication Services: A Framework for Building Enhanced IP Telephony Services," Computer Communications and Networks, 2004, ICCCN 2004, Proceedings, 13th International Conference in Chicago, IL, Oct. 11-13, 2004, pp. 535-540, XP010774567, ISBN 0-7803-8814-3.

\* cited by examiner

*Primary Examiner*—Melody Mehrpour
(74) *Attorney, Agent, or Firm*—Martin & Associates, LLC; Derek P. Martin (57) ABSTRACT

A portable phone a portable phone is equipped with a personal area network (PAN) detection mechanism to detect all portable phones and electronic identifiers (e.g., key fobs) in its PAN. A buddy list is included in the portable phone. If an electronic identifier is detected, such as from a key fob, but its corresponding portable phone is not, a proxy signal mechanism signals to the wireless telephone network that the phone may receive calls for a different phone. In response, the wireless telephone network routes calls for the different phone to the proxy phone instead. In this manner a phone may change functions automatically as devices enter and leave the PAN.

10 Claims, 7 Drawing Sheets

Buddy List

| Buddy Key Fob | Detected | Buddy Phone | Detected | Validated |
|---|---|---|---|---|
| Mike_KF | x | Mike_PH | x | x |
| Jim_W_KF | x | Jim_W_PH | x | |
| Bob_KF | x | Bob_PH | | x |
| Rick_KF | | Rick_PH | | |
| Sam_KF | x | Sam_PH | | |

MOBILE CALL ROUTING BASED ON DETECTED WIRELESS PERSONAL AREA NETWORK DEVICES

BACKGROUND OF THE INVENTION

1. Technical Field

This invention generally relates to telephone systems and more specifically relates to portable phones.

2. Background Art

Since Alexander Graham Bell uttered those famous words "Mr. Watson—come here—I want to see you", the telephone has evolved into a necessity of modern living. Land-based telephone systems are the most ubiquitous, and have been found in most homes and businesses in the United States for many decades. Recently, wireless phones have gained in popularity. Wireless phones include cellular phones, digital phones, satellite phones, etc. For the purpose of discussion herein, the term "portable phone" applies to any and all types of wireless phones, whether now known or developed in the future.

Despite the convenience of portable phones, there are some definite drawbacks. Having a portable phone does absolutely no good if a person is careless and forgets to take it. For example, if a man forgets his phone in his car as he goes into a store, no matter how urgent a phone call is, there is nothing he can do except wait until he can return to his phone and check his voice mail. A portable phone is also rendered useless when the battery dies. With a dead battery there is no way for him to receive his calls no matter how important they may be. Without a way for portable phone users to receive calls even when they don't have their mobile phones or when their mobile phones are not turned on, users of portable phones will continue to suffer from missed calls when their portable phone is missing or inoperative.

DISCLOSURE OF INVENTION

According to the preferred embodiments, a portable phone is equipped with a personal area network (PAN) detection mechanism to detect all portable phones and electronic identifiers (e.g., key fobs) in its PAN. A buddy list is included in the portable phone. If an electronic identifier is detected, such as from a key fob, but its corresponding portable phone is not, a proxy signal mechanism signals to the wireless telephone network that the phone may receive calls for a different phone. In response, the wireless telephone network routes calls for the different phone to the proxy phone instead. In this manner a phone in accordance with the preferred embodiments may accept calls for a user that has a device in the PAN of the phone as long as that device is contained in the phone's buddy list. In addition, the preferred embodiments include a proxy call notification mechanism in a phone to alert the proxy phone that the incoming call is for a buddy. In response, the portable phone alerts the user of the phone that an incoming call is for a buddy.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Portable phones have greatly enhanced the ability of people to communicate. Unfortunately, known portable phones are not one hundred percent reliable, resulting in frustration and discontentment when the phone does not perform as desired. If a phone is lost or forgotten, there is no way to receive calls no matter how important the calls may be. For example, even if a woman has her phone with her, if the battery dies, it is as useless as when she does not have it. The preferred embodiments described herein allow a phone to detect devices in the phone's Personal Area Network (PAN), and if a buddy's electronic identifier is in the phone's PAN and the buddy's corresponding portable phone is not, a signal is sent to the wireless telephone network to route all calls for the buddy's phone to the user's phone. The user's phone thus becomes a proxy phone for the buddy's calls, and the proxy phone receives calls for both.

Figure 1:
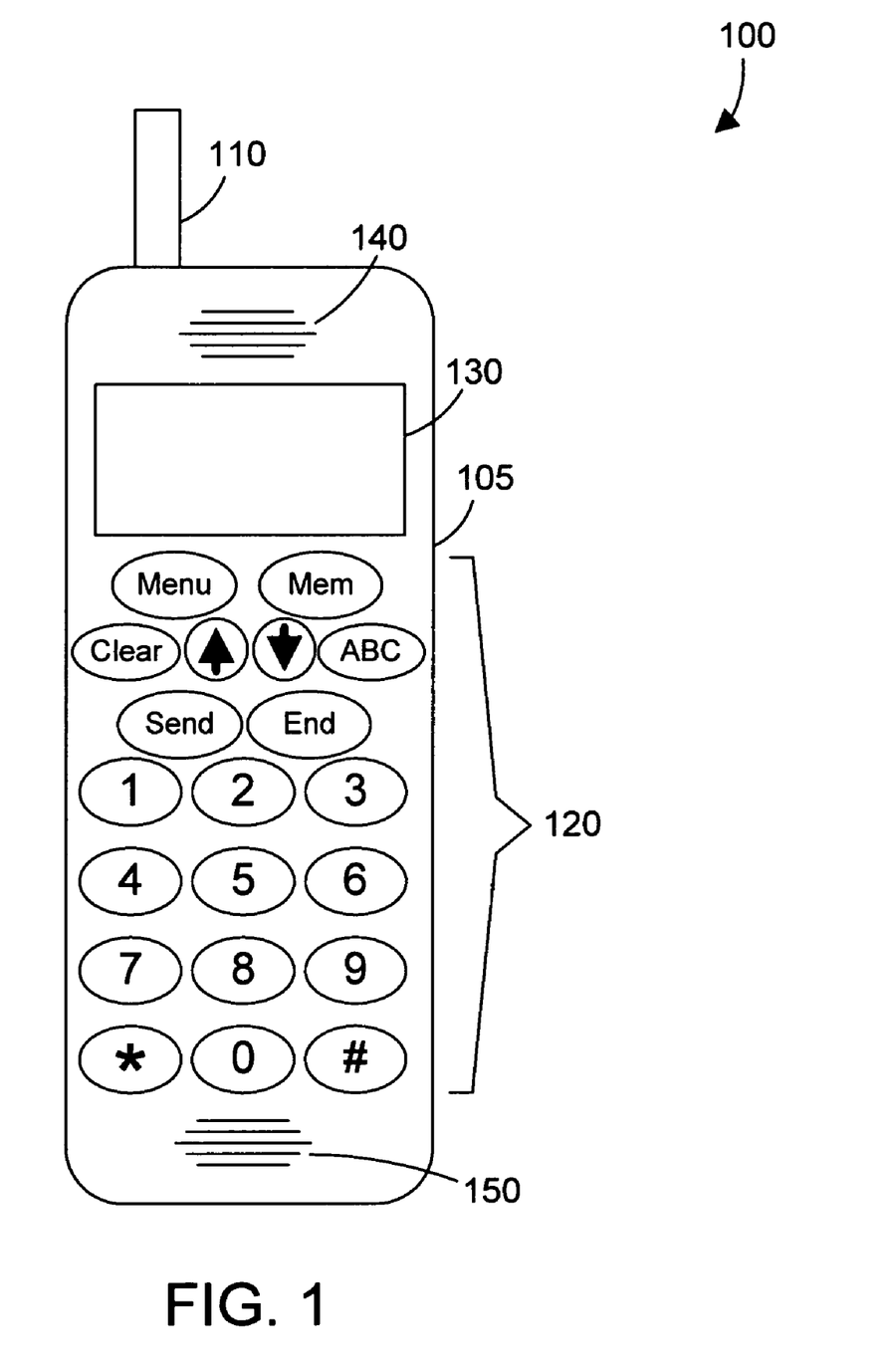
FIG. 1 is a diagram of a portable phone in accordance with the preferred embodiments.

Referring now to FIG. 1, a portable phone 100 in accordance with the preferred embodiments includes a case 105. Within or attached to case 105 are antenna 110, keypad 120, display 130, speaker 140, and microphone 150. Antenna 110 is a standard antenna as is known in the art for allowing portable phone 100 to communicate with its service provider in placing and receiving calls. Keypad 120 includes the traditional 10 numerals, star, and pound key found on most telephone keypads. In addition, keypad 120 includes a "Send" key for placing a call, an "End" key for terminating a call, a "Clear" key for clearing a portion of the display 130, a "Menu" key for displaying a menu on the display 130, up arrow and down arrow keys for scrolling through menus and lists on the display 130, a "Mem" key (short for "memory") that displays information stored in phone 100, and an "ABC" key that changes the ten numeral keys from numeric input to alpha character input. It is well known in the art that the 2 through 0 numeral keys on standard telephones include most of the alphabet characters. For the sake of clarity in the drawing, the alpha characters associated with numeral keys 2 through 0 are not shown. By pressing the "ABC" key, the phone enters and alpha input mode that allows inputting text information into phone 100 via keypad 120 that can be displayed on display 130. The keys on keypad 120 in FIG. 1 are shown by way of example, and many different keys not explicitly shown may be substituted or added within the scope of the preferred embodiments.

Display 130 is preferably a backlit liquid crystal display (LCD) that includes multiple lines of alphanumeric display capability. Speaker 140 is a small, low-power speaker as is known in the art for portable phones. In addition, microphone 150 is a small, low-power microphone as is known in the art for portable phones.

Figure 2:
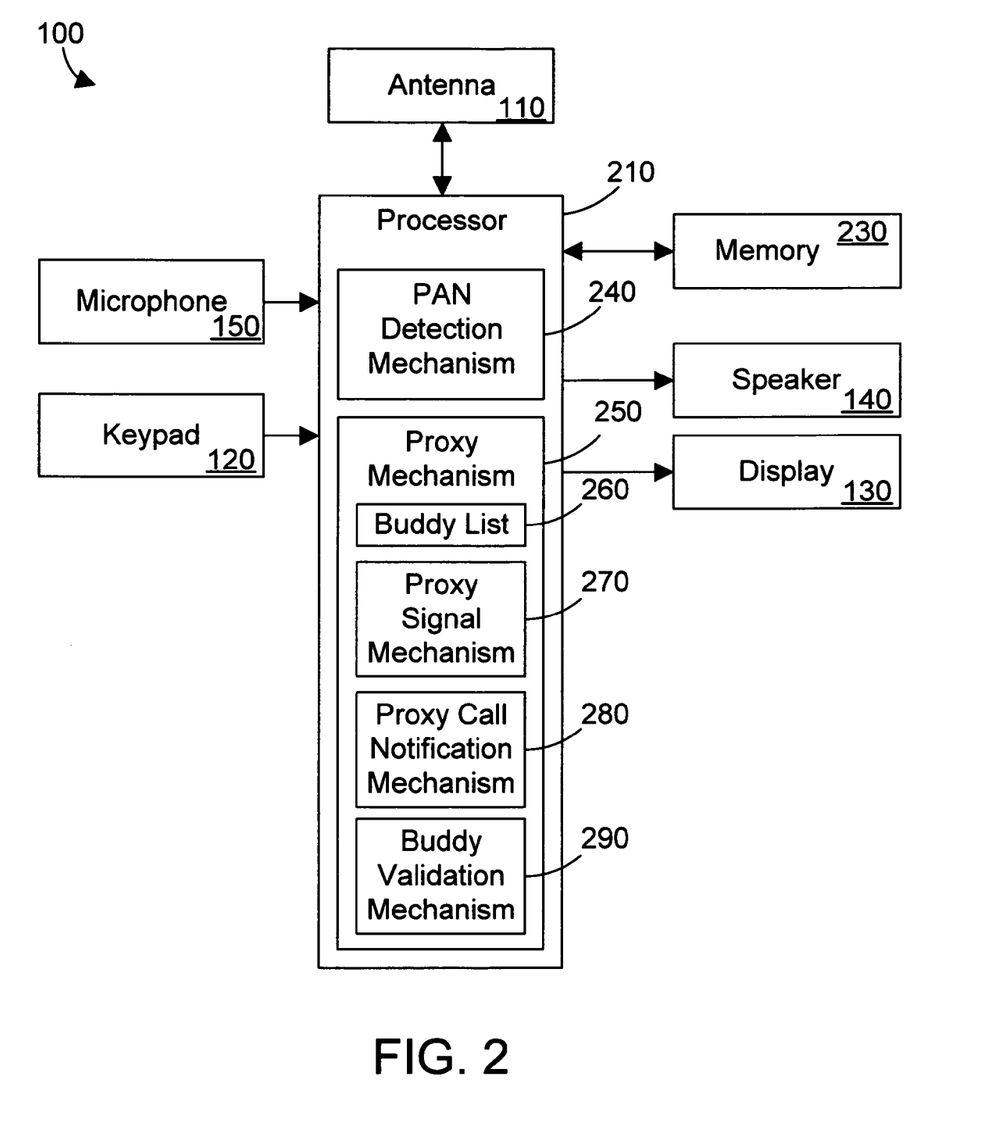
FIG. 2 is a block diagram of components in the portable phone of FIG. 1.

The components of FIG. 1, except for case 105, are shown in the block diagram of FIG. 2. The keypad 120 and microphone 150 are input devices, the display 130 and speaker 140 are output devices, and antenna 110 is both an input and an output device. Portable phone 100 includes a processor 210 that is coupled to the antenna 110, keypad 120, display 130, speaker 140, and microphone 150. In addition, processor 210 is also coupled to a memory 230. Memory 230 may include any combination of volatile and non-volatile memory. Processor 210 includes a PAN detection mechanism 240 and a proxy mechanism 250. PAN detection mechanism 240 detects devices within a personal area network (PAN) that includes the phone 100.

Proxy mechanism 250 preferably includes a buddy list 260, a proxy signal mechanism 270, a proxy call notification mechanism 280, and a buddy validation mechanism 290. Buddy list 260 preferably specifies one or more buddies. Buddy list 260 is explained in more detail below with respect to FIG. 4.

Proxy signal mechanism 270 sends a signal to the wireless telephone network to instruct the wireless telephone network to begin or terminate proxy operation of phone 100. Proxy call notification mechanism 280 receives a signal from the wireless telephone network when an incoming call is for a buddy. Buddy validation mechanism 290 provides an authentication mechanism that requires a buddy's consent in order for the buddy to be added to someone else's buddy list.

Processor 210 takes input from keypad 120, microphone 150, PAN detection mechanism 240, proxy mechanism 250, antenna 110, and memory 230, and generates appropriate output on display 130, speaker 140, antenna 110, and memory 230. Note that the block diagram of FIG. 2 does not include many components or features known in prior art portable phones. FIG. 2 is a simple diagram showing only the most commonly-known components and features that allow a complete description of the preferred embodiments of the present invention. Of course, portable phone 100 could also include any component or feature that is known in the art in addition to those shown within the scope of the preferred embodiments.

Figure 3:
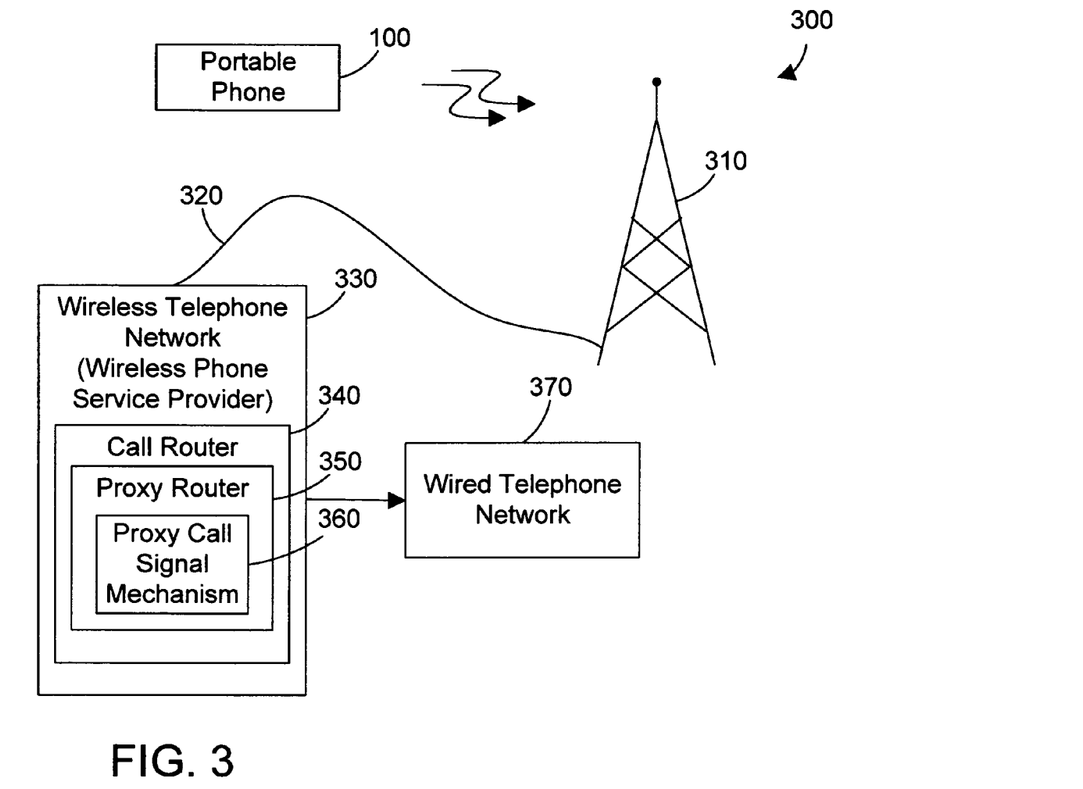
FIG. 3 is a block diagram of a telephone system in accordance with the preferred embodiments.

FIG. 3 shows one sample configuration of a system 300 that is useful in illustrating the concepts of the preferred embodiments. System 300 includes a portable phone 100 (e.g., as shown in FIGS. 1 and 2), a tower 310, a wireless telephone network 330, and a wired telephone network 370. Portable phone 100 communicates via wireless interface to tower 310. Tower 310 is coupled to a wireless telephone network 330. While FIG. 3 shows a hard-wire connection 320 between tower 310 and wireless telephone network 330, this connection could also be made via wireless interface. Wired telephone network 370 is representative of traditional land-based lines that are in common use today in telephone company networks.

Wireless telephone network 330 includes a call router 340. Call router 340 routes incoming calls to a corresponding subscriber's phone. Call router 340 includes a proxy router 350 that may be used to route calls to a subscriber's phone that are intended for a different phone. The proxy router 350 includes a proxy call signal mechanism 360 that alerts the portable phone 100 when the proxy router 350 is routing a proxy call to the portable phone 100. In the preferred embodiments, the proxy call signal mechanism 260 alerts a portable phone of an incoming proxy call by sending a message that is received by the proxy call notification mechanism 280 in the phone. The proxy call notification mechanism 280 may then provide a suitable notification to the user that the incoming call is a proxy call, including a different ringtone, text on the display 130, or other suitable audio or visual means of indicating a proxy call.

Figure 4:
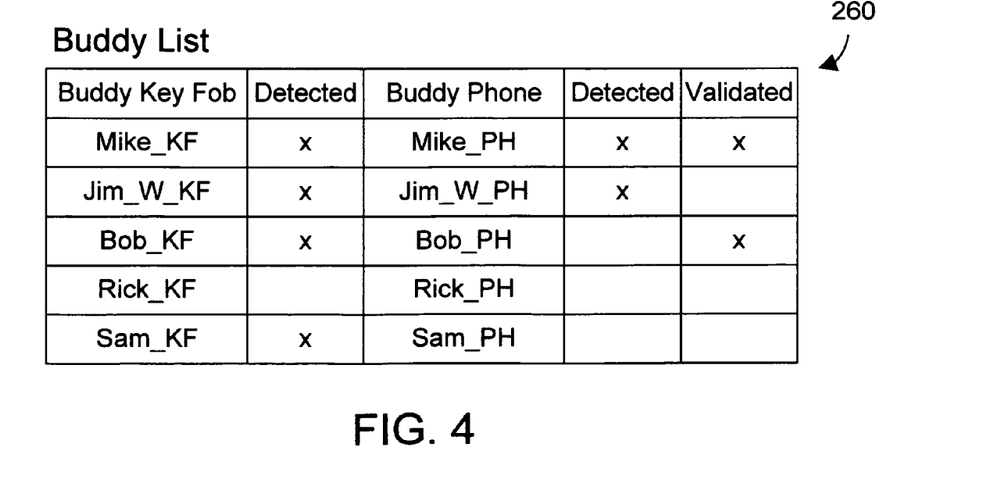
FIG. 4 is a block diagram of a table showing one suitable implementation for a buddy list within the scope of the preferred embodiments.

A sample buddy list 260 within the scope of the preferred embodiments is shown in FIG. 4. Note that each entry in the buddy list includes a buddy key fob and a corresponding buddy phone. The preferred embodiments allow proxy operation for a portable phone if the buddy's key fob is present, but the buddy's corresponding phone is not. For this reason, the buddy list includes identifiers that uniquely identify both the buddy's key fob and the buddy's corresponding phone. In the sample table in FIG. 4, a buddy key fob identifier Mike_KF has a corresponding phone identifier Mike_PH. Similarly, other entries have key fob identifiers that have a_KF suffix that correspond to matching buddy phones that have a_PH suffix. Of course, this simple scheme in FIG. 4 for matching a buddy's key fob to his phone is shown by way of example. The preferred embodiments expressly extend to any and all ways to correlate a buddy's key fob with a matching phone.

Note that FIG. 4 assumes a key fob is being used to uniquely identify each buddy. A key fob is a small electronic device that may be carried on a key ring. The key fob in accordance with the preferred embodiments has the capability of becoming a member of a personal area network (PAN). Note, however, that other implementations may be possible. For example, the key fob could contain a radio-frequency identifier (RFID) chip that sends out a unique identifier when activated with RF energy. The preferred embodiments expressly extend to any mechanism or method for providing an electronic identifier for a person that may be matched to a corresponding phone. For example, instead of a key fob implementation, a unique identifier in a person's wallet, or even embedded in a person's body, may be used to uniquely identify that individual. The key fob and RFID implementations discussed herein are specific examples of electronic identifiers that could be used by a portable phone within the scope of the preferred embodiments.

The preferred embodiments allow proxy routing of calls when a buddy's electronic identifier is detected, but the buddy's corresponding phone is not detected. The phone that detects the buddy's electronic identifier and does not detect the buddy's phone signals to the wireless telephone network to route the buddy's calls to the phone, thereby causing the phone to become a proxy phone for the buddy's calls. As used herein, the term proxy phone is used to denote a phone to which calls for another phone may be routed.

The buddy list 260 in FIG. 4 shows different buddies in different states. We assume the buddy list is in Bill's phone. The data in FIG. 4 shows that Mike's key fob is detected, along with his portable phone. Jim's key fob is also detected, along with his portable phone. Bob's key fob is detected, but his matching phone is not. Neither Rick's key fob nor his matching phone is detected. Sam's key fob is detected, but his matching phone is not. This means that Bill, Mike, Jim, Bob and Sam are all in close proximity. Bill, Mike and Jim each have their portable phone, while Bob and Sam do not.

Mike and Bob's entries in the buddy list have been validated, while Jim's has not. This means that if the battery in Mike's portable phone goes dead, Mike's phone will not be detected any longer, and Bill's phone will initiate proxy service for Mike. However, because Jim's entry in the buddy list has not been validated, if the battery in Jim's phone goes dead, Bill's phone will not initiate proxy service for Jim because Jim's entry in the buddy list has not been validated. Because Bob's key fob is detected but the corresponding (matching) phone is not detected, and because Bob's entry in the buddy list has been validated, Bill's phone will initiate proxy service, requesting the wireless telephone network to route Bob's calls to Bill's phone. Although Sam's key fob has been detected, and his corresponding phone has not been detected, Bill's phone will not initiate proxy service for Sam's phone because the entry for Sam in the buddy list has not been validated.

Note that it is possible for a buddy to be in a buddy list of two different phones. This would be the case, for example, if Bob were on both Bill's and Jim's buddy lists. In this case, any suitable algorithm or heuristic could be used to arbitrate between Bill's and Jim's phone to determine which one acts as a proxy for Bob's calls.

Figure 5:
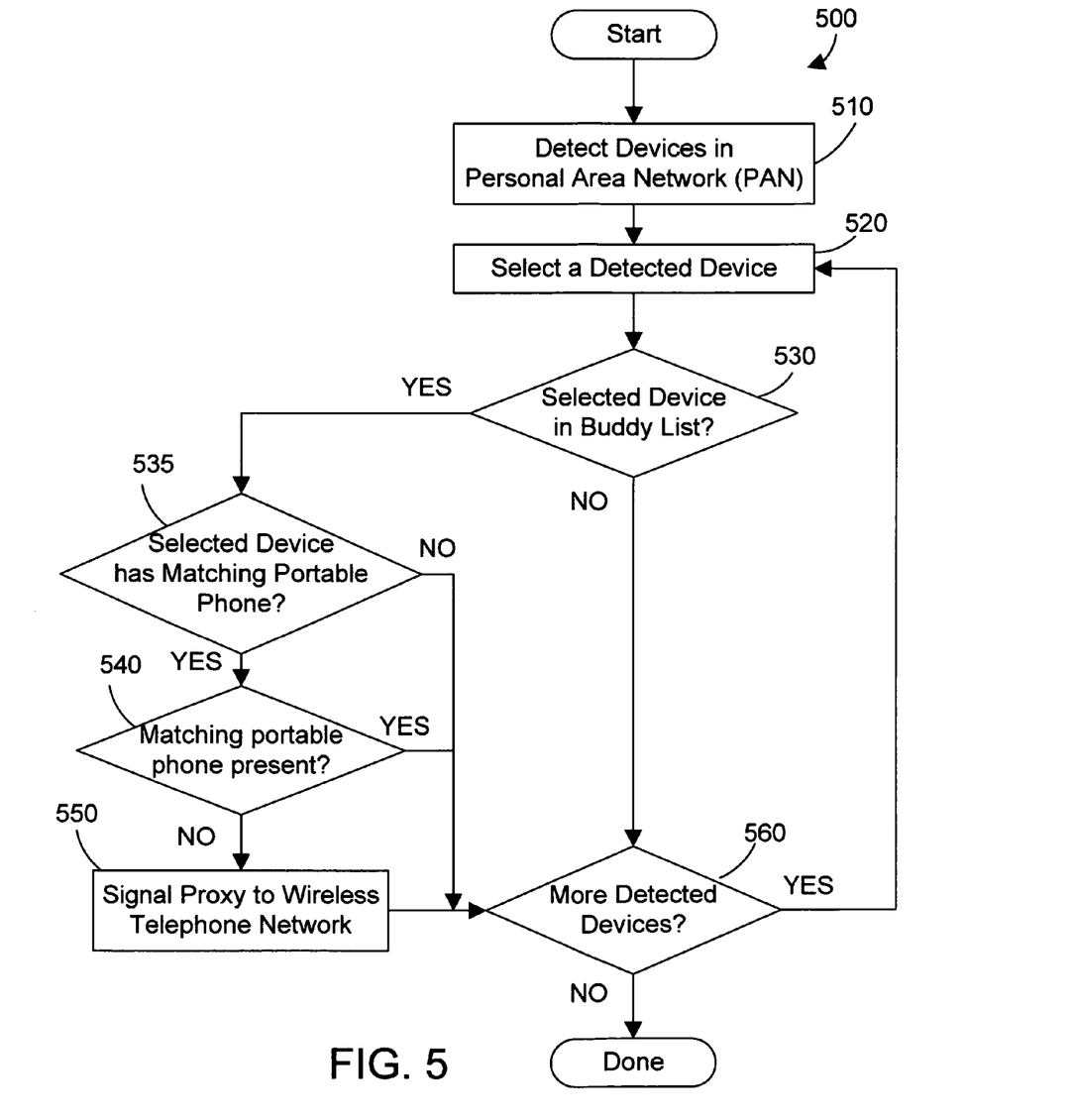
FIG. 5 is a flow diagram of a method in accordance with the preferred embodiments for the portable phone in FIGS. 1-3 to detect devices in its Personal Area Network (PAN), and for sending a proxy signal to the wireless telephone network for devices that are in its PAN and that are also in its buddy list.

Referring to FIG. 5, a method 500 shows the steps performed by a portable phone of the preferred embodiments, such as portable phone 100 shown in FIGS. 1-3. First all devices in the phone's personal area network (PAN) are detected (step 510). One of the detected devices is then selected (step 520). If the selected device is in the phone's buddy list (step 530=YES), method 500 checks to see if the selected device has a matching portable phone (step 575). A device that has a matching portable phone is a key fob, RFID device, or other device that may transmit an electronic identifier. If the selected phone does not have a matching portable phone (step 535=NO), method 500 checks to see if there are more detected devices to process (step 560). If the selected device has a matching portable phone (step 535=YES), method 500 checks for the presence of the matching portable phone (step 540). If the matching portable phone is not present (step 540=NO), a signal is sent to the wireless telephone network (step 550) to indicate that calls for the buddy's phone should be routed to the proxy phone. If there are more devices to process (step 560=YES), steps 520-560 are repeated until there are no more detected devices in the PAN to process. If in step 540 the matching phone is present (540=YES), the proxy signal is not sent because the buddy can receive calls on his own phone. If the selected device is not in the buddy list (step 530=NO), no proxy signal is sent. When there are no more detected devices to process (step 560=NO), method 500 is done. Method 500 thus allows the portable phone to determine whether a buddy's key fob is present in the PAN without the buddy's phone. If so, the portable phone may become a proxy phone for that buddy.

Figure 6:
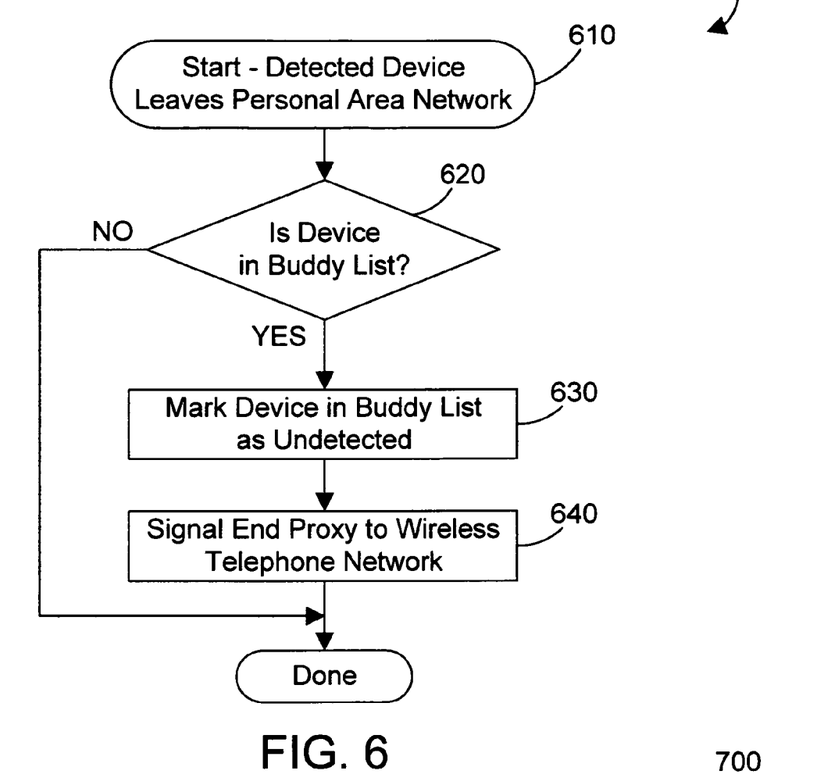
FIG. 6 is a flow diagram of a method in accordance with the preferred embodiments for the portable phone of FIGS. 1-3 when a device leaves the PAN.

Referring to FIG. 6, a method 600 shows the steps the portable phone automatically takes when a detected device leaves its PAN (step 610). First it checks to see if the device that left the PAN is in the buddy list (step 620). If the device that left the PAN is in the buddy list (step 620=YES), then the device is marked in the buddy list as undetected (step 630). A signal is then sent to wireless telephone network to end proxy service for that buddy (step 640). If the device that left the PAN is not in the buddy list (step 620=NO), then nothing is changed, and service continues as normal. Method 600 outlines the steps that are performed when a detected device leaves a portable phone's PAN.

Figure 7:
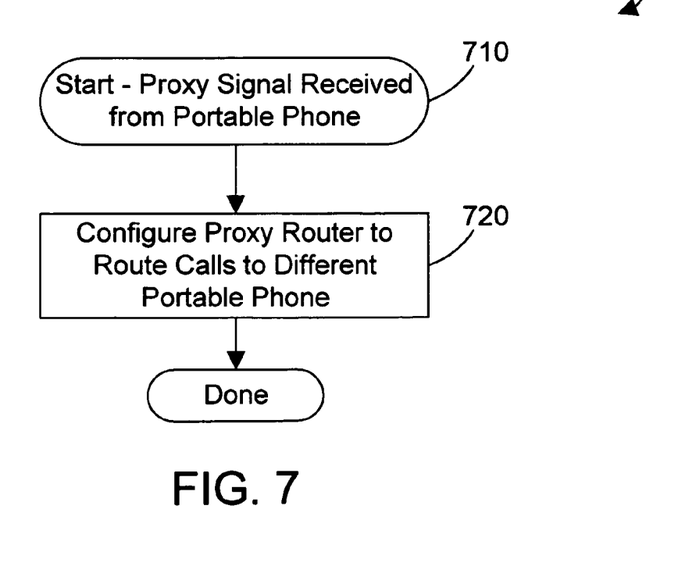
FIG. 7 is a flow diagram of a method in accordance with the preferred embodiments for a wireless telephone network to receive a proxy signal from a portable phone, and in response, to configure a proxy router to route calls for a subscriber to a different portable phone.

Referring to FIG. 7, a method 700 shows the steps that a wireless telephone network 330 could take in accordance with the preferred embodiments when a proxy signal is received from a portable phone (step 710). The proxy router 350 would be configured to route calls to a different portable phone (step 720). This configuration could be done in numerous ways depending on the specific wireless telephone network 330, but would have the same result as long as calls for the absent phone that corresponds to a detected electronic identifier are routed instead to the proxy phone. Method 700 describes the steps the wireless telephone network could take when a proxy signal is received from a portable phone.

Figure 8:
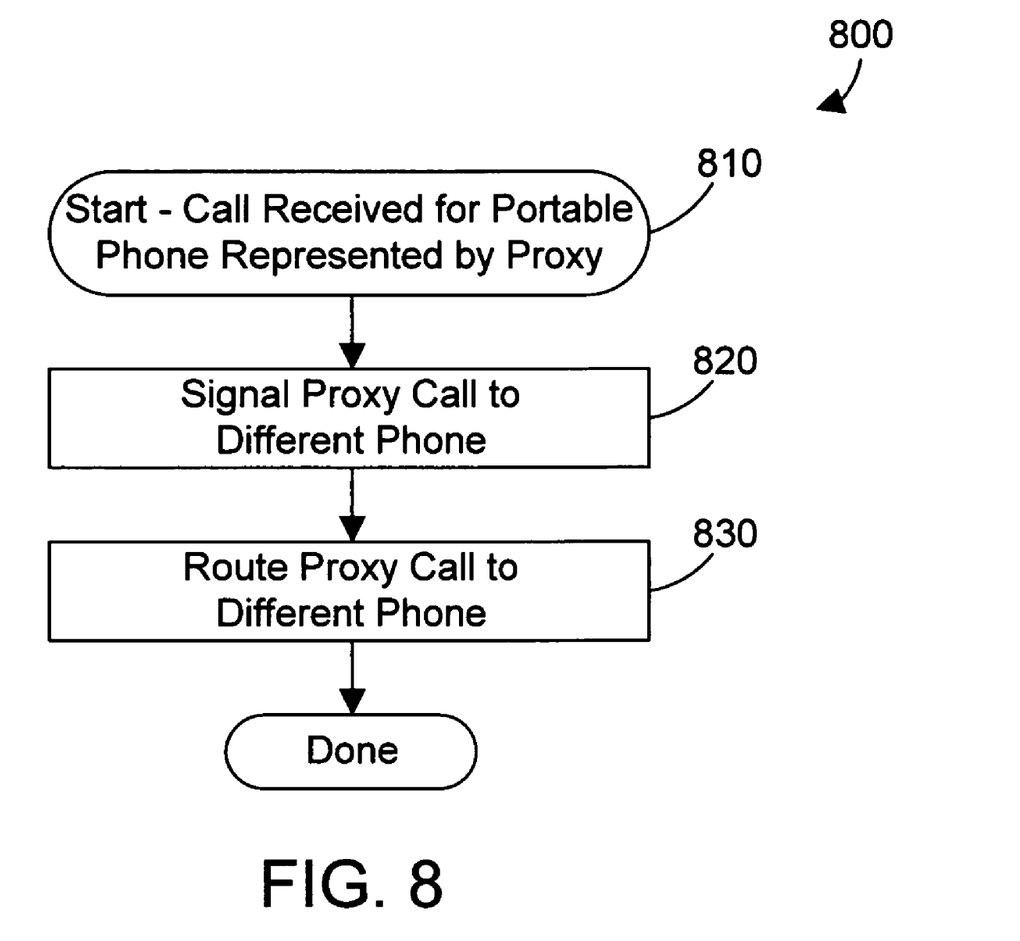
FIG. 8 is a flow diagram of a method in accordance with the preferred embodiments for the wireless telephone network in FIG. 3 to receive a call and to route the call to a buddy's phone.

Referring to FIG. 8, a method 800 outlines steps the proxy router 350 may take when a call is received by the wireless telephone network for a portable phone that is being represented by a proxy phone (step 810). The proxy call signal mechanism 360 (FIG. 3) generates a signal that is sent to the proxy phone (step 820). This signal can do different things for each proxy phone, and the function could vary depending on the phone's settings and capabilities. For the preferred embodiments we assume that proxy phone 100 has the capability to have a different ring tone when a call is preceded by a proxy call signal. The proxy router 350 will send a proxy call signal (step 820), followed by routing the call to the proxy phone (step 830), causing the proxy phone to ring with a different ring tone. In the alternative, text on the display or other audio of visual means of signaling a proxy call may also be used. The preferred embodiments expressly extend to all mechanisms and methods for sending a proxy phone a signal, then routing the call to said proxy phone, and for providing a suitable notification to the user of a proxy call.

Figure 9:
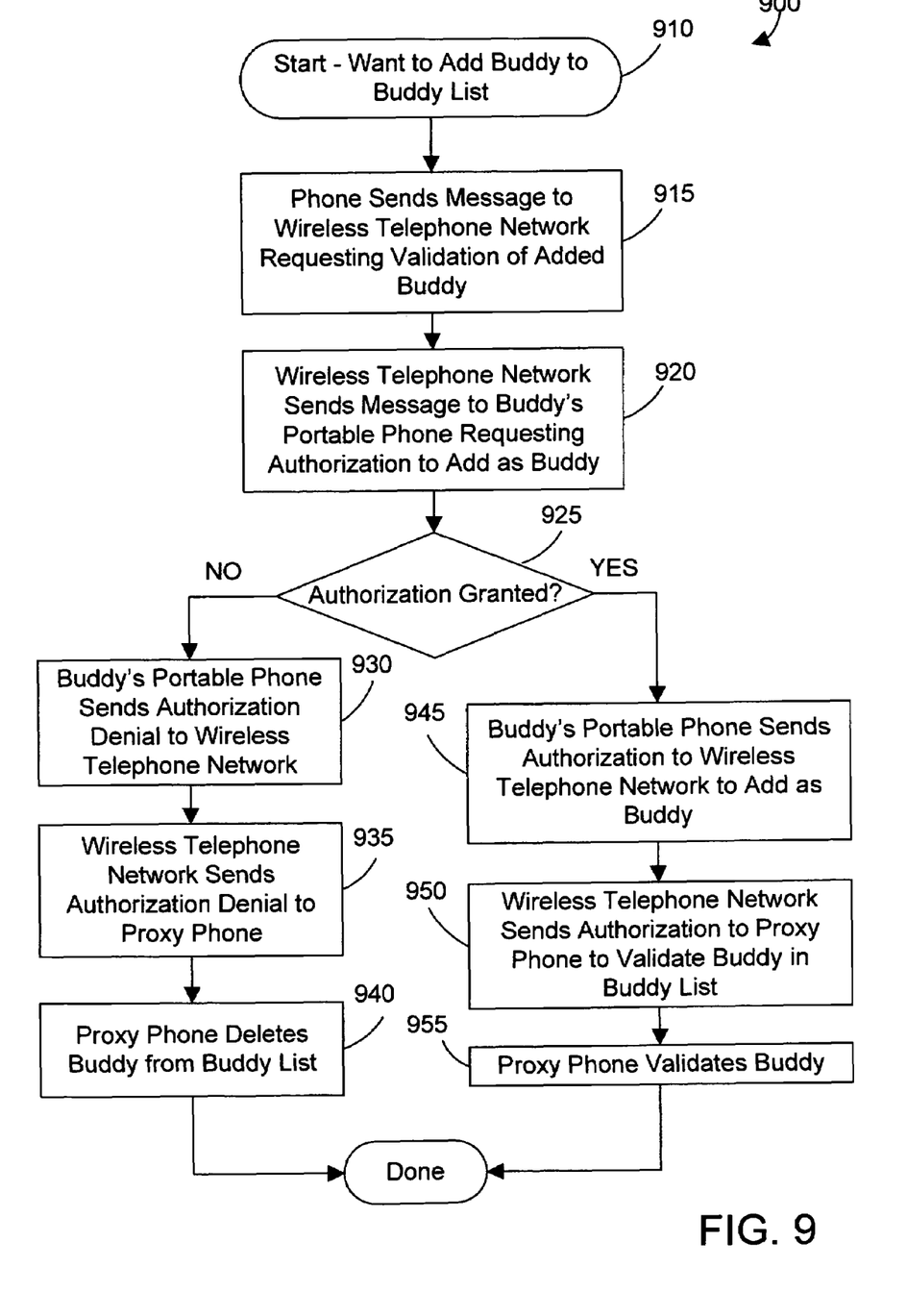
FIG. 9 is a flow diagram of a method in accordance with the preferred embodiments to add a buddy to a buddy list.

In FIG. 9, a method 900 within the scope of the preferred embodiments begins when a user wants to add a buddy to the buddy list in his or her phone (step 910). First, the user specifies the buddy in some suitable way, such as getting the buddy information from an address book, entering a new contact, or any other process of specifying buddy information. The portable phone 100 then sends a message to the wireless telephone network requesting validation of the buddy (step 915). The wireless telephone network sends a message to the buddy's portable phone requesting the buddy's authorization to add him or her as a buddy (step 920). This message could be in text, voice, or any other message form that the buddy can respond to and give authorization. If authorization is granted (step 925=YES), the buddy's portable phone sends an authorization message to the wireless telephone network to add the buddy to the buddy list of the proxy phone (step 945). The wireless telephone network then sends authorization to the proxy phone to validate the buddy in its buddy list 250 (step 950). The buddy is then marked in the buddy list as a validated buddy (step 955), as shown in the entry in buddy list 260 in FIG. 4 for Mike and Bob. If authorization is not granted (step 925=NO), the buddy's portable phone sends a message indicating denial of authorization to the wireless telephone network (step 930). The wireless telephone network then sends an authorization denial message to the proxy phone (step 935). As a result of the denial of authorization in step 935, the proxy phone deletes the buddy from its buddy list (step 940). In the process of granting authorization a password may be used to further protect the identity of the buddy.

In a different implementation, a person's phone may be missing or dead before he has a chance to authorize a buddy's phone as a proxy. In this case, the authorization mechanism could be a simple password that is stored in or derived from data in the key fob. During the validation process on the buddy's phone, the buddy could select "local validation"

which would then require the buddy to enter his password on the buddy's phone. Once the password is entered, the buddy is validated in the buddy list. The preferred embodiments extend to any way for providing authorization to validate a buddy, whether now known or developed in the future.

One variation in accordance with the preferred embodiments allows for selectively enabling and disabling the proxy function. For example, let's assume a woman wants to "lend" her phone to a friend. Before handing the phone to the friend, the woman could enter a special key code or select a menu function to disable the proxy function of the phone, to avoid having the calls for the phone forwarded to a buddy within range of the woman's key fob. Once the phone is returned, the proxy operation could be easily enabled via a menu selection or special key code.

The present invention provides enhanced functionality for a portable phone by allowing the portable phone to change its function automatically and act as a proxy for another phone if that phone is not present, the buddy is in the buddy list, and the buddy's key fob is within the PAN (or other electronic identifier is in proximity). In addition, the phone may signal the wireless telephone network to request that the phone act as a proxy for another phone, or to terminate proxy operation for another phone. A signal from the wireless telephone network may also precede each call to a proxy phone to signal a proxy call. There is also a process to determine if the buddy has given authorization for calls to be forwarded by a message being sent from the proxy phone to the buddy's phone and back again through the wireless telephone network to authorize the addition of the buddy to the proxy phone's buddy list. The result is a portable phone that is much more user-friendly, adapting itself to the programmed needs of the user automatically as phones and people move in and out of the PAN.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. A portable phone comprising:
   a personal area network (PAN) detection mechanism that detects via wireless interface devices in close enough physical proximity to the portable phone to be within the PAN;
   a proxy mechanism coupled to the PAN detection mechanism, the proxy mechanism comprising:
      a buddy list that lists key fob devices that may be detected by the PAN detection mechanism and a corresponding phone that may be detected by the PAN detection mechanism; and
      a proxy signal mechanism that sends a proxy signal to the wireless telephone network to instruct the wireless telephone network to route the calls for a second portable phone to the portable phone if the PAN detection mechanism detects a key fob device in the buddy list but does not detect the corresponding second portable phone.

2. The portable phone of claim 1 wherein the proxy mechanism further comprises:
   a proxy call notification mechanism that receives a proxy call signal from the wireless telephone network when a call being routed to the portable phone is a call that was originally intended for the second portable phone.

3. The portable phone of claim 2 wherein the proxy call notification mechanism provides notification to a user when a call being routed to the portable phone is a call that was originally intended for the second portable phone.

4. The portable phone of claim 1 wherein the proxy mechanism further comprises:
   a buddy validation mechanism that requires a person corresponding to a key fob device to authorize the addition of the corresponding key fob device to the buddy list.

5. The portable phone of claim 1 wherein, upon a detected device leaving the physical proximity of the portable phone, the proxy mechanism determines if calls for a second portable phone are being routed to the portable phone, and if so, the proxy mechanism sends a signal to the wireless telephone network to no longer route the calls for the second portable phone to the portable phone.

6. A telephone system comprising:
   (A) a first portable phone comprising:
      a personal area network (PAN) detection mechanism that detects via wireless interface devices in close enough physical proximity to the first portable phone to be within the PAN;
      a proxy mechanism coupled to the PAN detection mechanism, the proxy mechanism comprising:
         a buddy list that lists key fob devices that may be detected by the PAN detection mechanism and a corresponding portable phone that may be detected by the PAN detection mechanism; and
         a proxy signal mechanism that sends a proxy signal to the wireless telephone network to instruct the wireless telephone network to route the calls for a second portable phone to the first portable phone if the PAN detection mechanism detects a key fob device in the buddy list but does not detect the corresponding second portable phone;
   (B) at least one key fob device that includes an electronic identifier for a person, wherein the key fob device may be detected by the PAN detection mechanism;
   (C) the second portable phone comprising:
      a mechanism that sends an electronic identifier for the second portable phone that may be detected by the PAN detection mechanism; and
   (D) the wireless telephone network receiving the message from the proxy signal mechanism in the first portable phone, and in response, routes calls for the second portable phone to the first portable phone.

7. The telephone system of claim 6 wherein the proxy mechanism in the first portable phone further comprises:
   a proxy call notification mechanism that receives a proxy call signal from the wireless telephone network when a call being routed to the first portable phone is a call that was originally intended for the second portable phone.

8. The telephone system of claim 7 wherein the proxy call notification mechanism provides notification to a user when a call being routed to the portable phone is a call that was originally intended for the second portable phone.

9. The telephone system of claim 6 wherein the proxy mechanism in the first portable phone further comprises:
   a buddy validation mechanism that requires a person corresponding to a key fob device to authorize the addition of the corresponding key fob device to the buddy list.

10. The telephone system of claim 6 wherein, upon a detected device leaving the physical proximity of the portable phone, the proxy mechanism in the first portable phone determines if calls for a second portable phone are being routed to the portable phone, and if so, the proxy mechanism sends a signal to the wireless telephone network to no longer route the calls for the second portable phone to the portable phone.

* * * * *